US012614058B2

(12) United States Patent
    Lorrain et al.

(10) Patent No.: US 12,614,058 B2
(45) Date of Patent: Apr. 28, 2026

(54) ARCHITECTURE OF A COMPUTER FOR CALCULATING A CONVOLUTION LAYER IN A CONVOLUTIONAL NEURAL NETWORK

(71) Applicant: COMMISSARIAT A L'ENERGIE ATOMIQUE ET AUX ENERGIES ALTERNATIVES, Paris (FR)

(72) Inventors: Vincent Lorrain, Saulx-les-Chartreux (FR); Olivier Bichler, Meille-Eglise-en-Yvelines (FR); Mickael Guibert, Le Perreux-sur-Marne (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1149 days.

(21) Appl. No.: 17/270,853

(22) PCT Filed: Aug. 28, 2019

(86) PCT No.: PCT/EP2019/072903
    § 371 (c)(1),
    (2) Date: Feb. 23, 2021

(87) PCT Pub. No.: WO2020/043753
    PCT Pub. Date: Mar. 5, 2020

(65) Prior Publication Data
    US 2021/0241071 A1      Aug. 5, 2021

(30) Foreign Application Priority Data
    Aug. 31, 2018    (FR) ........................................ 1857852

(51) Int. Cl.
    *G06N 3/04*      (2023.01)
    *G06F 5/01*      (2006.01)
    (Continued)

(52) U.S. Cl.
    CPC ................. *G06N 3/04* (2013.01); *G06F 5/01* (2013.01); *G06F 17/153* (2013.01); *G06F 17/16* (2013.01); *G06N 3/10* (2013.01)

(58) Field of Classification Search
    CPC .... G06N 3/04; G06N 3/10; G06F 5/01; G06F 17/153; G06F 17/16
    See application file for complete search history.

(56) References Cited

U.S. PATENT DOCUMENTS

| | | | | |
|---|---|---|---|---|
| 3,748,451 A | * | 7/1973 | Ingwersen | .............. G06F 17/16 |
| | | | | 708/603 |
| 8,103,606 B2 | * | 1/2012 | Moussa | ................. G06N 3/063 |
| | | | | 706/31 |

(Continued)

FOREIGN PATENT DOCUMENTS

| | | | | | |
|---|---|---|---|---|---|
| CN | 107025317 A | * | 8/2017 | .............. | G06N 3/04 |
| EP | 1576494 B1 | * | 4/2007 | .............. | G06F 17/16 |

(Continued)

OTHER PUBLICATIONS

Chuan-Lin and Tse-Yun Feng, "Chapter 2—Parallel Architectures and Interconnection Networks", published on Jan. 23, 2014 at https://www.cs.hunter.cuny.edu/~sweiss/course_materials/csci493.65/lecture_notes/chapter02/pdf, retrieved Jun. 4, 2024. (Year: 2014).*

(Continued)

*Primary Examiner* — Shourjo Dasgupta
(74) *Attorney, Agent, or Firm* — BakerHostetler

(57) ABSTRACT

A computer for computing a convolutional layer of an artificial neural network, includes at least one set of at least two partial sum computing modules connected in series, a storage member for storing the coefficients of at least one convolution filter, each partial sum computing module comprising at least one computing unit configured so as to carry out a multiplication of an item of input data of the computer and a coefficient of a convolution filter, followed by an (Continued)

addition of the output of the preceding partial sum computing module in the series, each set furthermore comprising, for each partial sum computing module except the first in the series, a shift register connected at input for storing the item of input data for the processing duration of the preceding partial sum computing modules in the series.

13 Claims, 11 Drawing Sheets

(51) Int. Cl.
G06F 17/15 (2006.01)
G06F 17/16 (2006.01)
G06N 3/10 (2006.01)

(56) References Cited

U.S. PATENT DOCUMENTS

| | | | | |
|---|---|---|---|---|
| 10,635,740 | B2 * | 4/2020 | Phelps | G06F 5/015 |
| 2011/0208795 | A1 * | 8/2011 | Pajaniradja | H03H 17/0202 |
| | | | | 708/308 |
| 2014/0160135 | A1 * | 6/2014 | Krig | G06F 9/38 |
| | | | | 345/505 |
| 2018/0046906 | A1 | 2/2018 | Dally et al. | |
| 2018/0341495 | A1 * | 11/2018 | Culurciello | G06F 9/3895 |

FOREIGN PATENT DOCUMENTS

| | | | | | |
|---|---|---|---|---|---|
| EP | 1576493 | B1 | * | 1/2008 | G06F 7/5318 |
| FR | 3 050 846 | A1 | | 11/2017 | |
| GB | 2554491 | A | * | 4/2018 | G06F 9/3001 |
| JP | 2009245381 | A | * | 10/2009 | |
| JP | 5262248 | B2 | * | 8/2013 | |
| JP | 2018073103 | A | * | 5/2018 | |
| KR | 20180036587 | A | * | 4/2018 | G06F 7/523 |
| WO | WO-2019227518 | A1 | * | 12/2019 | G06K 9/6276 |

OTHER PUBLICATIONS

James Garland, etc., "Low Complexity Multiply-Accumulate Units for Convolutional Neural Networks with Weight-Sharing", published on May 1, 2018 via arXiv, id 1801.10219v3, retrieved Jun. 4, 2024. (Year: 2018).*

Vinyak Gokhale, etc., "Snowflake: An Efficient Hardware Accelerator for Convolutional Neural Networks", published in 2017 IEEE International Symposium on Circuits and Systems, pp. 1-4, 2017, retrieved Jun. 4, 2024. (Year: 2017).*

Sugil Lee, etc., "Double MAC on a DSP: Boosting the Performance of Convolutional Neural Networks on FPGAs", published in print Apr. 5, 2018, and otherwise published via IEEE Transactions on Computer-Aided Design of Integrated Circuits and Systems, vol. 38, issue 5, 2019, retrieved Jun. 4, 2024. (Year: 2018).*

Chengbo Xue, etc., "A Reconfigurable Pipelined Architecture for Convolutional Neural Network Acceleration", published via 2018 IEEE International Symposium on Circuits and Systems (ISCAS), May 27-30, 2018, Florence, Italy, retrieved Mar. 31, 2025. (Year: 2018).*

"Shift Registers: Serial-in, Serial-out", published to https://www.allaboutcircuits.com/textbook/digital/chpt-12/serial-in-serial-out-shift-register on Jun. 21, 2005, retrieved Mar. 31, 2025. (Year: 2005).*

"Shift Registers: Parallel-in, Serial-out", published to https://www.allaboutcircuits.com/textbook/digital/chpt-12/parallel-in-serial-out-shift-register on Jun. 21, 2005, retrieved Mar. 31, 2025. (Year: 2005).*

"LPM_SHIFTREG Megafunction", published to https://people.ece.cornell.edu/land/courses/ece5760/DE1_SOC/lpm_shiftreg.pdf on Mar. 5, 2013, retrieved Mar. 31, 2025. (Year: 2013).*

ECE410 at Michigan State University, "Binary Adder", published to https://www.egr.msu.edu/classes/ece410/mason/files/Ch12.pdf on Aug. 10, 2011, retrieved Mar. 31, 2025. (Year: 2011).*

Shannon Hilbert, "Verilog Shift Register", published to https://www.bitweenie.com/listings/verilog-shift-register on Feb. 12, 2013, retrieved Mar. 31, 2025. (Year: 2013).*

"Digital Electronics—Shift Registers", published to https://www.tutorialspoint.com/digital-electronics/digital-electronics-shift-registers.htm on Sep. 13, 2016, retrieved Mar. 31, 2025. (Year: 2016).*

Stylianos I. Venieris, etc., "Latency-Driven Design for FPGA-based Convolutional Neural Networks", published via 2017 27th International Conference on Field Programmable Logic and Applications (FPL), Sep. 4-8, 2017, Ghent, Belgium, retrieved Mar. 31, 2025. (Year: 2017).*

"Multi-Cycle Pipeline Operations", published on Jun. 30, 2009 to https://ece-research.unm.edu/jimp/611/slides/chap3_6.html, retrieved Mar. 31, 2025. (Year: 2009).*

Denis A. Gudovskiy, etc., "ShiftCNN: Generalized Low-Precision Architecture for Inference of Convolutional Neural Networks", published on Jun. 7, 2017 to arXiv, retrieved Mar. 31, 2025. (Year: 2017).*

"Using Look-Up Tables as Shift Registers (SRL16) in Spartan-3 Generation FPGAs", published to https://my.eng.utah.edu/~cs3710/xilinx-docs/xapp465.pdf, dated May 20, 2005, retrieved Mar. 31, 2025. (Year: 2005).*

Mark A. Horowitz, etc., "SPIM: A Pipelined 64×64-bit Iterative Multiplier", published to IEEE Journal of Solid-State Circuits, vol. 24, No. 2, Apr. 1989, retrieved Oct. 3, 2025. (Year: 1989).*

Fukushima, "Neocognitron: A self-organizing neural network model for a mechanism of pattern recognition unaffected by shift in position", Biological Cybernetics, 36(4), pp. 193-202, 1980.

Zhang, et al, "Optimizing FPGA-based accelerator design for deep convolutional neural networks", FPGA '15: Proceedings of the 2015 ACM/SIGDA International Symposium on Field-Programmable Gate Arrays, pp. 161-170, Feb. 2015.

Rahman et al., "Efficient FPGA acceleration of convolutional neural networks using logical 3D compute array", 2016 Design, Automation & Test in Europe Conference & Exhibition (Date), Mar. 2016.

Meloni, et al., "NEURAghe: Exploiting CPU-FPGA Synergies for Efficient and Flexible CNN Inference Acceleration on Zynq SoCs", ACM Transactions on Reconfigurable Technology and Systems, vol. 1, No. 1, 2017.

Li, et al., "A high performance FPGA-based accelerator for large-scale convolutional neural networks", 2016 26th International Conference on Field Programmable Logic and Applications (FPL), 2016.

* cited by examiner

ARCHITECTURE OF A COMPUTER FOR CALCULATING A CONVOLUTION LAYER IN A CONVOLUTIONAL NEURAL NETWORK

CROSS-REFERENCE TO RELATED APPLICATIONS

This application is a National Stage of International patent application PCT/EP2019/072903, filed on Aug. 28, 2019, which claims priority to foreign French patent application No. FR 1857852, filed on Aug. 31, 2018, the disclosures of which are incorporated by reference in their entirety.

FIELD OF THE INVENTION

The invention relates to artificial neural networks, more precisely to convolutional neural networks, and pertains in particular to a computer configured so as to implement a convolutional layer in a convolutional neural network.

BACKGROUND

Artificial neural networks are computational models imitating the operation of biological neural networks. Artificial neural networks comprise neurons that are interconnected by synapses, which are conventionally implemented by digital memories. The synapses may also be implemented by resistive components the conductance of which varies as a function of the voltage applied across their terminals. Artificial neural networks are used in various fields in which (visual, audio, inter alia) signals are processed, such as for example in the field of image classification or of image recognition.

Convolutional neural networks correspond to a particular model of artificial neural networks. Convolutional neural networks were first described in the article by K. Fukushima, "Neocognitron: A self-organizing neural network model for a mechanism of pattern recognition unaffected by shift in position. Biological Cybernetics, 36(4):193-202, 1980. ISSN 0340-1200. doi: 10.1007/BF00344251".

Convolutional neural networks (as they are known, or "deep (convolutional) neural networks" or even "ConvNets") are neural networks without a recurrent connection ("feedforward"), inspired by biological visual systems.

Convolutional neural networks (CNN) are used notably in image classification systems to improve classification. Applied to image recognition, these networks make it possible to learn intermediate representations of objects in the images, which intermediate representations are smaller and able to be applied generally to similar objects, thereby facilitating recognition thereof. However, the intrinsically parallel operation and the complexity of conventional convolutional-neural-network classifiers has slowed their effective implementation in on-board systems. Specifically, on-board systems impose strict constraints in terms of footprint and power consumption.

In particular, convolutional neural networks comprise one or more convolutional layer(s), which are particularly expensive in terms of number of operations. The operations that are performed are mainly multiplication and accumulation (MAC) operations. Moreover, in order to comply with the latency and processing time constraints specific to the targeted applications, it is necessary to parallelize the computations as much as possible.

There is therefore a need for computers that make it possible to implement a convolutional layer of a neural network with limited complexity in order to satisfy the constraints of on-board systems and of the targeted applications.

In known architectures implementing convolutional layers, MAC operations are performed in part by multiplication operators separate from the addition operators. Parallelism is generally achieved by carrying out multiplications or partial sums in parallel, and then by recombining the partial results at the end of the computation, thus requiring additional addition operators.

Some solutions have been proposed to implement convolutional layers of neural networks using specialized computing architectures. The existing solutions may be grouped into two computational approaches, a "single instruction on multiple data" or SIMD approach in which the input data are received and processed in parallel and in blocks, and a "data flow" approach in which the input data are received sequentially in real time. The invention is positioned in the field of computing architectures using the "data flow" approach.

Multiple computing architectures have been proposed in this approach.

A first possible architecture, called "line buffer", consists in aligning the data at input with the convolution filter so as to carry out the convolution computation fully in parallel using a product recombination tree. Some solutions following this approach are described notably in the article "Optimizing FPGA-based accelerator design for deep convolutional neural networks, C Zhan et al" and in the article "Efficient FPGA acceleration of convolutional neural networks using logical 3D compute array, A Rahman et al".

These solutions have the drawback of implementing the proposed computing structure as many times as there are input matrices, thereby generating an additional cost in terms of footprint. In addition, aligning the input values with the coefficients of the convolution filter complicates the use of the external memory.

A second possible architecture, called partial sum architecture, consists in storing not the input values, but partial sums of the convolution computation. Such an architecture is described notably in the article "A high performance FPGA-based accelerator for large scale convolutional neural networks, H. Li et al". One drawback of this solution is that it requires the use of an adder tree, which is a particular device consisting essentially of accumulators.

SUMMARY OF THE INVENTION

The invention proposes a convolutional layer computing architecture that mainly uses MAC operators that perform an addition followed by a multiplication. The use of such operators has the advantage of being able to efficiently use the resources of a signal processor (DSP) that natively and optimally implements such operators. The invention is thus particularly suitable for an implementation in the form of an FPGA programmable logic circuit containing a very large number (hundreds or even thousands) of blocks of DSP signal processors.

For an implementation on an application-specific integrated circuit (ASIC), MAC operators may also be implemented in an optimized manner. The invention thus does not require a computing structure that requires a dedicated implementation, such as an adder tree. The invention therefore has the advantage of an implementation that requires less logic to be implemented and therefore less energy consumption for the final integrated circuit.

Furthermore, by chaining the convolution computations for all of the input matrices, the invention makes it possible to minimize the number of memory read and write access operations per cycle, and therefore the number of RAM memory blocks required.

This is advantageous for integrating the computing architecture proposed by the invention on an FPGA programmable logic circuit, which generally has fewer memory blocks than blocks of DSP processors. The invention thus makes it possible to use all of the DSP processors of an FPGA circuit, without this being limited by the number of available RAM memory blocks.

In order to implement the invention on an ASIC integrated circuit, it is also advantageous to use fewer memory blocks in order to optimize footprint and consumption.

The subject of the invention is a computer for computing a convolutional layer of an artificial neural network, comprising at least one set of at least two partial sum computing modules connected in series, a storage member for storing the coefficients of at least one convolution filter, each partial sum computing module comprising at least one computing unit configured so as to carry out a multiplication of an item of input data of the computer and a coefficient of a convolution filter, followed by an addition of the output of the preceding partial sum computing module in the series or of a predefined value for the first partial sum computing module in the series, each set furthermore comprising, for each partial sum computing module except the first in the series, a shift register connected at input for storing the item of input data for the processing duration of the preceding partial sum computing modules in the series, the computer furthermore comprising at least one accumulator connected at output of each set and a memory, the input data of the computer coming from at least two input matrices, each partial sum computing module (PE_POOL) being configured so as to receive, at input, the input data belonging to different input matrices and having the same coordinates in each input matrix.

According to one particular aspect of the invention, the computer supplies, at output, for each input sub-matrix of dimension equal to that of the convolution filter, the value of a corresponding output neuron, the set of output neurons being arranged in at least one output matrix.

According to one particular aspect of the invention, each partial sum computing module comprises at most a number of computing units equal to the dimension of the convolution filter.

According to one particular aspect of the invention, each set comprises at most a number of partial sum computing modules equal to the number of input matrices.

According to one particular aspect of the invention, the computer comprises at most a number of sets equal to the number of output matrices.

According to one particular aspect of the invention, for each received item of input data, each partial sum computing module is configured so as to compute a partial convolution result for all of the output neurons connected to the item of input data.

According to one particular aspect of the invention, each partial sum computing module comprises multiple computing units, each one being configured so as to compute a partial convolution result for different output neurons of the other computing units.

According to one particular aspect of the invention, each partial sum computing module is configured, for each received item of input data, so as to select, in the storage member, the coefficients of a convolution filter corresponding to the respective output neurons to be computed for each computing unit.

According to one particular aspect of the invention, the input matrices are images.

According to one particular aspect of the invention, the storage member has a two-dimensional toroidal topology.

According to one particular aspect of the invention, the at least one accumulator connected at output of each set is configured so as to finalize a convolution computation in order to obtain the value of an output neuron from the partial sums delivered by the set, the memory being used to save partial results of the convolution computation.

According to one particular aspect of the invention, the addresses of the values stored in the memory are determined so as to avoid two output neurons during the computation sharing the same memory block.

According to one particular aspect of the invention, the computer furthermore comprises an activation module for activating an output neuron, connected at output of each accumulator.

BRIEF DESCRIPTION OF THE DRAWINGS

Other features and advantages of the present invention will become more clearly apparent upon reading the following description with reference to the appended drawings, in which.

DETAILED DESCRIPTION

Figure 1A:
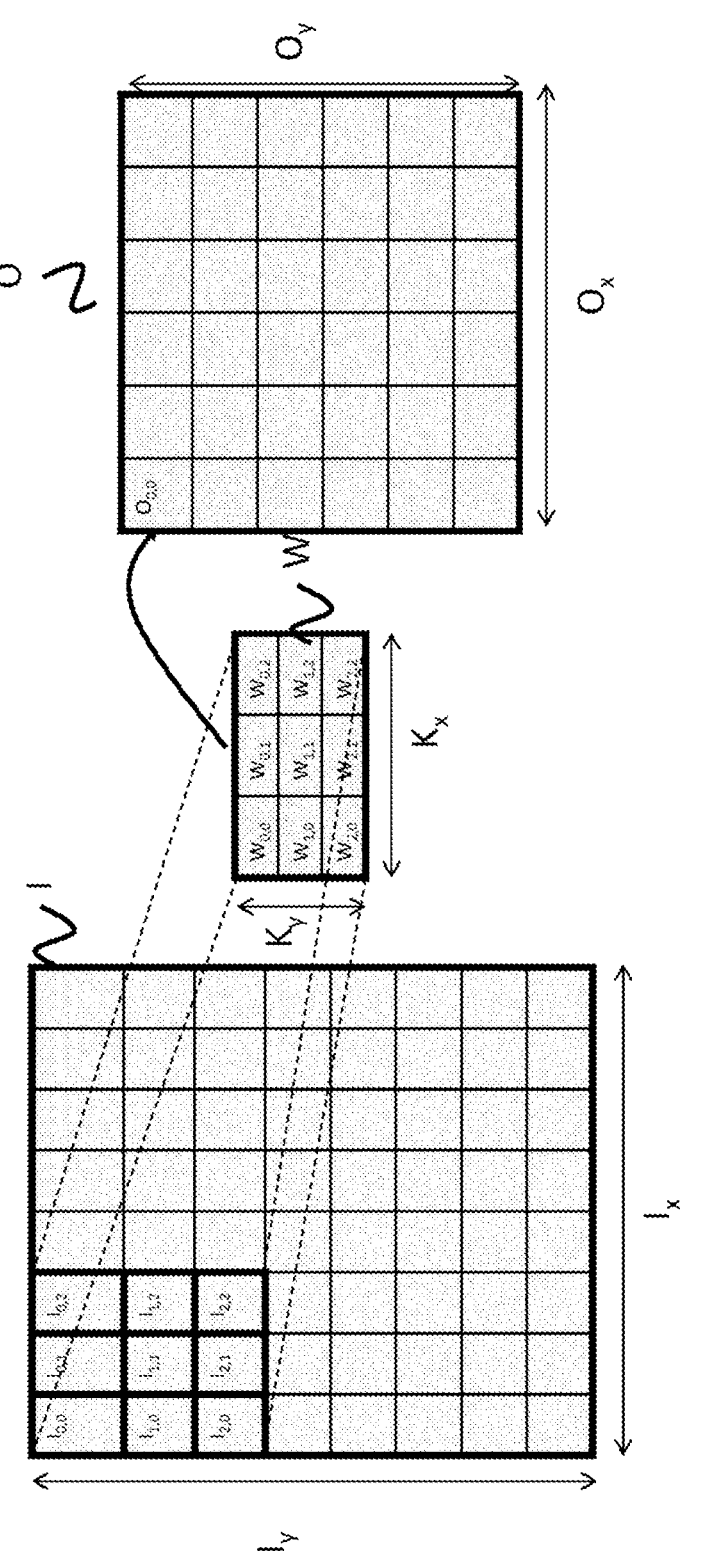
FIGS. 1a, 1b, 1c and 1d show several illustrations of the operation of a convolutional layer of a convolutional neural network.

A convolutional neural network generally consists of one or more convolutional layers that are connected in series or in cascade. One or more pooling layers may be arranged between two convolutional layers.

The invention relates specifically to a computer architecture configured so as to implement a convolutional layer of a convolutional neural network.

For ease of understanding of the invention, a reminder is first of all given of the general operating principle of a convolutional layer.

A convolutional layer forms a connection between an input matrix I and an output matrix O. The input matrix I may be a matrix containing input data supplied to the neural network, when the convolutional layer is the first layer of the neural network. The input matrix I may also be a matrix containing the results supplied by a preceding convolutional layer, when the neural network comprises at least two convolutional layers.

The output matrix O comprises the values of the neurons that are connected to the input matrix I. The output matrix O may be the input matrix of another convolutional layer.

The input and output matrices may also be referred to as input and output maps.

In a convolutional layer, each neuron is connected to at least one portion (sub-matrix) of the input matrix I. The sub-matrices have the same size for one and the same layer, and their size is equal to the size of the convolution filter. They may be offset from one another regularly and may overlap. The input matrix may be of any size. It may notably have N dimensions, N being an integer greater than two. However, the input matrix is generally two-dimensional.

In cases of applications in which the neural network receives images at input, the input matrix contains the values of the pixels of an image in levels of gray. For a color image, or more generally an image with multiple components, a different input matrix is used for each component.

In a neural network, the neurons are connected to their input sub-matrix I by synapses the weight of which is adjustable. The matrix W of the synaptic weights (the synaptic weights are also called "weight coefficients" or "convolution coefficients" or "weightings") that is applied to the input sub-matrices of the neurons is the same for all the neurons of a given output matrix. Such a matrix W is also called a filter or "convolution kernel". The fact that the convolution kernel is shared by all of the neurons of a given output matrix O, and therefore applied to all of the input matrix, decreases the memory required to store the coefficients, thereby optimizing performance. For example, for image recognition, this makes it possible to minimize the number of filters or intermediate representations that best code the features of the image and that are reusable over the whole image. The coefficients of a convolution kernel W (that is to say the synaptic weights) may correspond to conventional signal-processing filters (for example Gaussian, Gabor, Laplace, etc. filters), or be determined by supervised or unsupervised learning, for example using a gradient-back-propagation algorithm. The coefficients of the convolution kernels may be positive or negative and are generally normalized to between −1 and 1, just like the input and output values of the neurons.

A convolutional layer may contain one or more convolution kernels that each have an input matrix, which may be the same, but that have different coefficients corresponding to different filters.

Each convolution kernel in a layer produces a different output matrix, such that the output neurons are different for each kernel. In other words, multiple different output matrices may be connected to one or more different input matrices. Each output matrix is associated with a different filter W. Likewise, each input matrix may also be associated with a different filter.

Convolutional networks may also include local or global pooling layers that combine the outputs of a neuron group of one or more output maps. The outputs may be combined for example by taking, for the corresponding output, the maximum or average value of the outputs of the neuron group over the output map of the pooling layer. The pooling layers allow the size of the output maps to be reduced from one layer to another in the network, while at the same time improving its performance by making it more tolerant to small deformations or translations in the input data.

FIGS. 1a-1d illustrate the general operation of a convolutional layer.

FIG. 1a shows an input matrix I of size $(I_x, I_y)$ connected to an output matrix O of size $(O_x, O_y)$ via a convolutional layer carrying out a convolution operation using a filter W of size $(K_x, K_y)$.

A value $O_{i,j}$ of the output matrix O (corresponding to the output value of an output neuron) is obtained by applying the filter W to the corresponding sub-matrix of the input matrix I.

FIG. 1a shows the first value $O_{0,0}$ of the output matrix O obtained by applying the filter W to the first input sub-matrix of dimensions equal to those of the filter W.

Figure 1B:
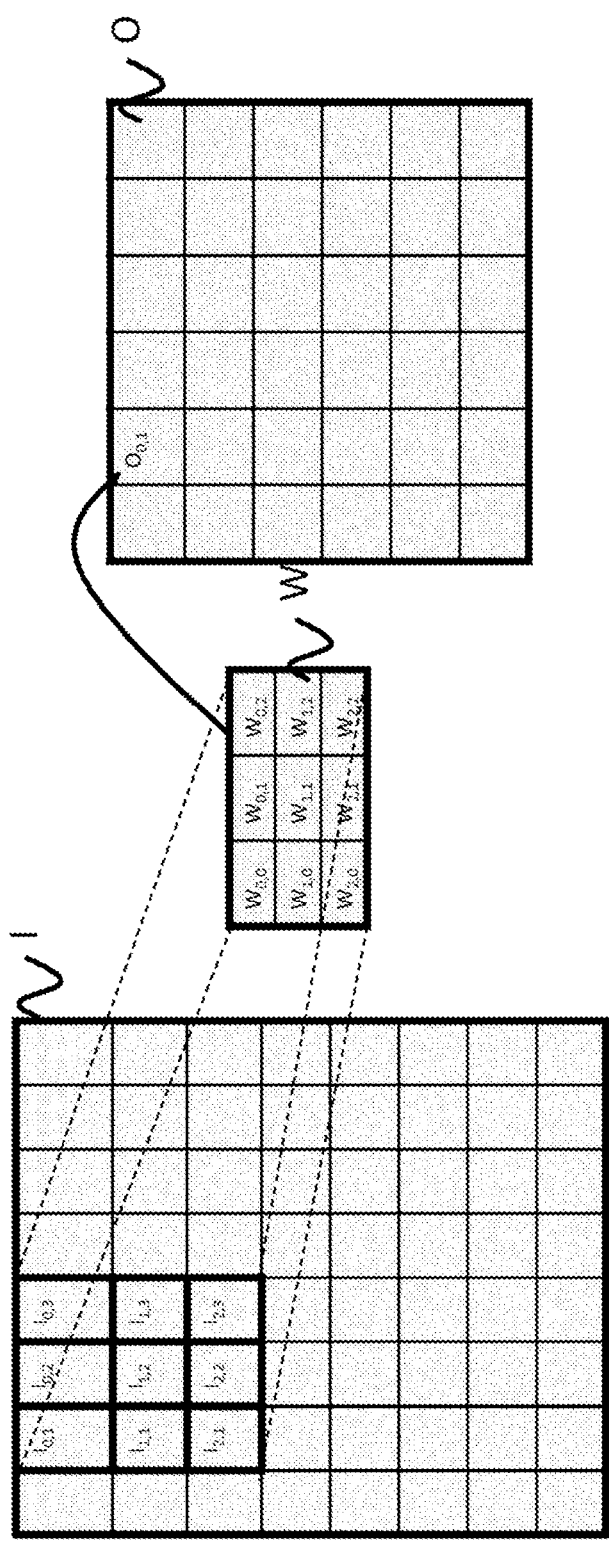

FIG. 1b shows the second value $O_{0,1}$ of the output matrix O obtained by applying the filter W to the second input sub-matrix.

Figure 1C:
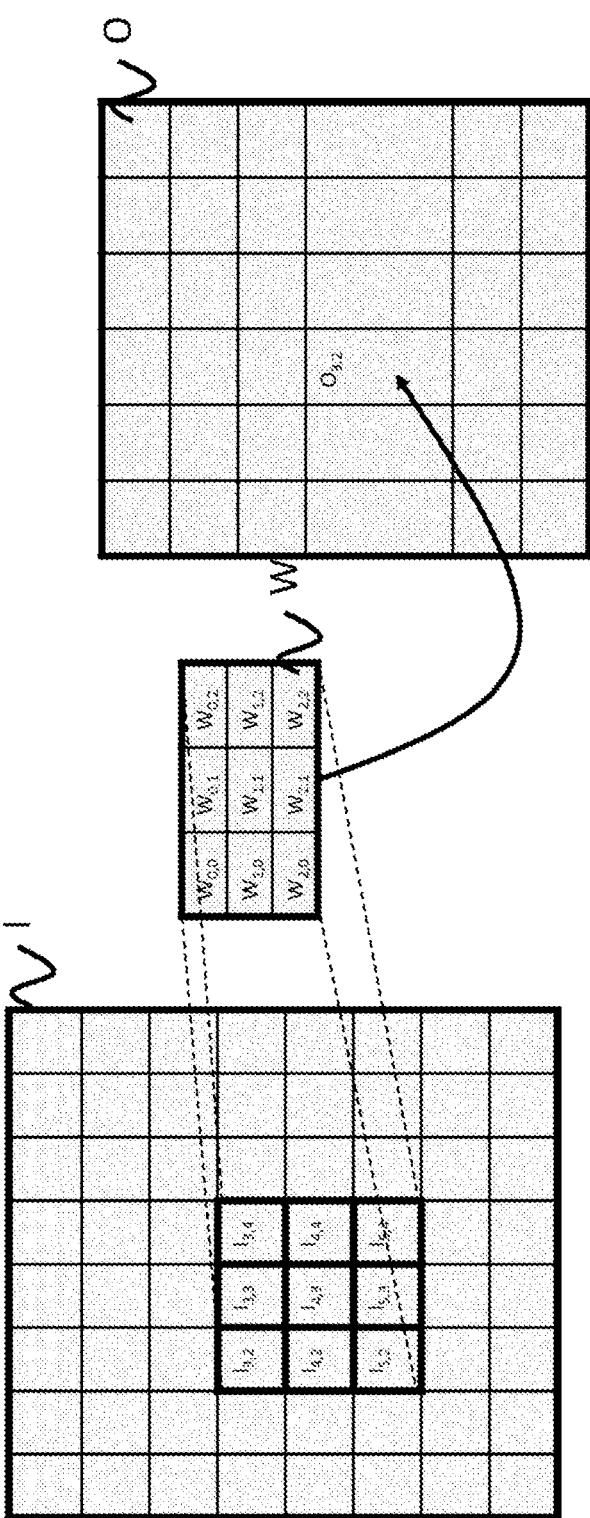

FIG. 1c shows a general case of computing an arbitrary value $O_{3,2}$ of the output matrix.

In general, the output matrix O is connected to the input matrix I by a convolution operation, via a convolution kernel or filter W. Each neuron of the output matrix O is connected to a portion of the input matrix I, this portion being called "input sub-matrix" or else "neuron receptor field" and being of the same dimensions as the filter W. The filter W is common for all of the neurons of an output matrix O.

The values of the output neurons $O_{i,j}$ are given by the following relationship:

$$O_{i,j} = g\left( \sum_{k=0}^{min(K_x-1,I_x-I.s_i)} \sum_{l=0}^{min(K_y-1,I_y-j.s_j)} I_{i.s_i+k, j.s_j+l} \cdot W_{n,k,l} \right) \quad (1)$$

In the above formula, g( ) denotes the activation function of the neuron, while $s_i$ and $s_j$ respectively denote the vertical and horizontal stride parameters. Such a stride corresponds to the offset between each application of the convolution kernel on the input matrix. For example, if the stride is greater than or equal to the size of the kernel, then there is no overlap between each application of the kernel. The filter $W_n$ corresponds to the convolution kernel that connects the output matrix O to an input matrix $I_n$. Various filters may be associated with various input matrices for the same output matrix.

For simplicity, the activation function g( ) is not shown in FIGS. 1a-1d.

FIGS. 1a-1c illustrate a case in which a single output matrix O is connected to a single input matrix I.

Figure 1D:
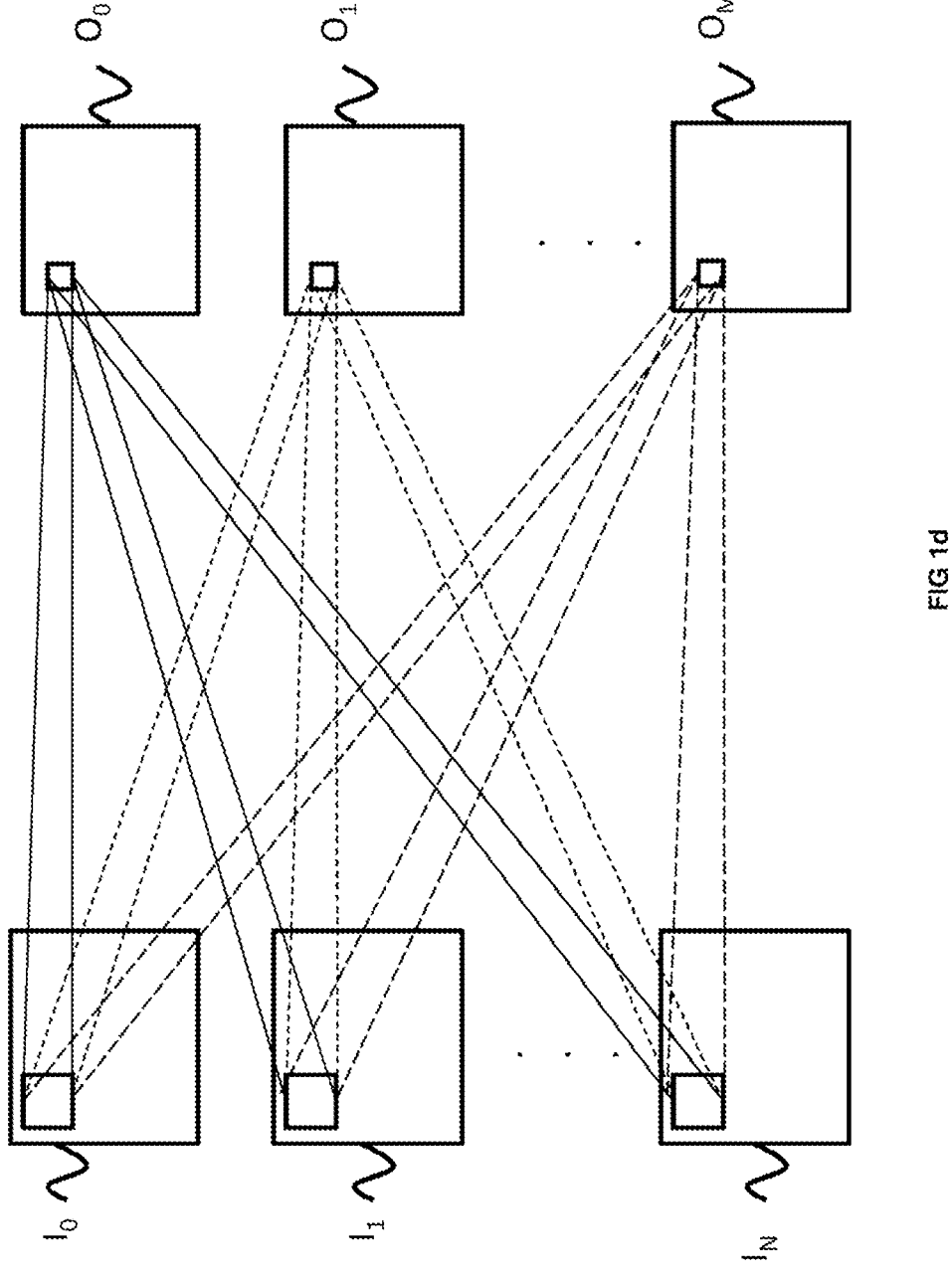

FIG. 1d illustrates another case in which multiple output matrices Om are each connected to multiple input matrices $I_n$. In this case, each output matrix Om is connected to each input matrix $I_n$ via a convolution kernel $K_{m,n}$ that may be different depending on the output matrix.

Moreover, when an output matrix is connected to multiple input matrices, the convolutional layer, in addition to each convolution operation described above, sums the output values of the neurons obtained for each input matrix. In other words, the output value of an output neuron is in this case equal to the sum of the output values obtained for each convolution operation applied to each input matrix.

The values of the output neurons $O_{i,j}$ are in this case given by the following relationship:

$$O_{i,j} = g\left( \sum_{n=0}^{N} \sum_{k=0}^{min(K_x-1,I_x-I.s_i)} \sum_{l=0}^{min(K_y-1,I_y-j.s_j)} I_{n,i.s_i+k, j.s_j+l} \cdot W_{n,k,l} \right) \quad (2)$$

One embodiment of the computing device according to the invention will now be described with reference to FIGS. 2, 3 and 4.

As indicated in the preamble, the invention relates to a computer configured so as to implement a convolutional layer of a neural network, carrying out the function described above. The computer according to the invention thus receives, at input, one or more input matrices comprising input data and supplies, at output, one or more output matrices comprising values of output neurons. The input data may be pixels of one or more images or more generally components of one or more images.

The computer according to the invention has an architecture in the form of three blocks or modules, which are nested. Each block corresponding to one aspect in the processing of the convolution is described in one of FIGS. 2, 3 and 4.

Figure 2:
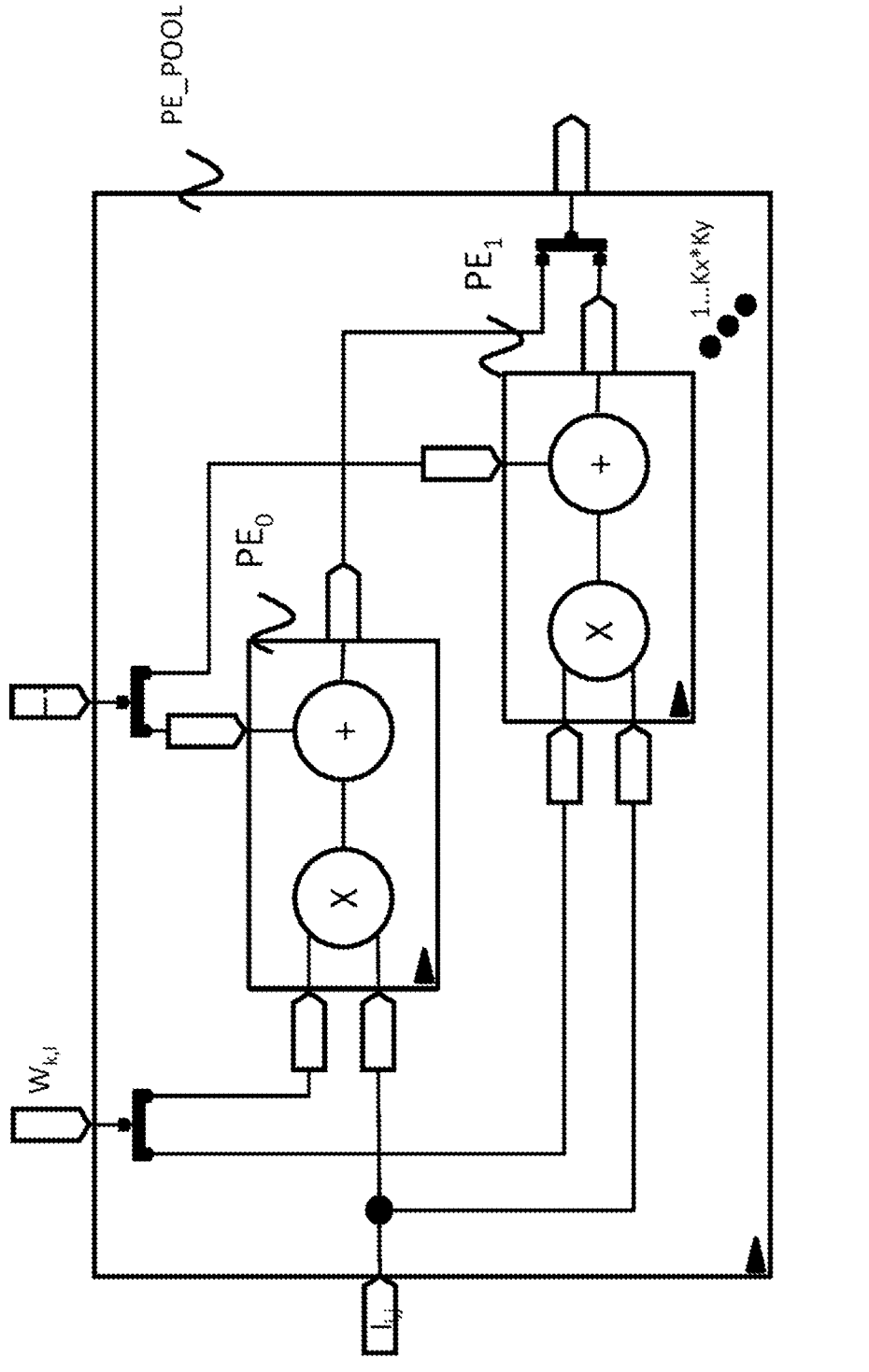
FIG. 2 shows a diagram of a partial sum computing module according to the invention, configured so as to compute a partial sum of a convolution computation.

A first computing module PE_POOL is described in FIG. 2. This first computing module PE_POOL is hereinafter called partial sum computing module. Specifically, as will be explained hereinafter, a computing module PE_POOL carries out a partial sum of the global convolution computation in order to obtain the output values of the neurons.

A partial sum computing module PE_POOL comprises one or more identical computing units $PE_0$, $PE_1$, each one being configured so as to carry out an operation of multiplying two input values followed by an operation of adding a third value to the result of the multiplication. In other words, a computing unit $PE_0$, $PE_1$ is configured so as to carry out what is called a multiplication then accumulation operation, also called "multiply-accumulate" or more simply MAC. In the remainder of the description, the computing units $PE_0$, $PE_1$ will be called MAC computing units.

A partial sum computing module PE_POOL comprises a number of MAC computing units between one and $K_x*K_y$, depending on the intended degree of parallelization. For example, if the number of MAC computing units is equal to $K_x*K_y$, the computations carried out by a partial sum computing module PE_POOL are fully parallelized. On the other hand, if it comprises just one MAC computing unit, all of the computations that are carried out are sequential. Finally, if this number is strictly between one and $K_x*K_y$, the computations are partially parallelized and partially sequentialized.

A partial sum computing module PE_POOL receives, in each clock cycle, a value $I_{i,j}$ of an input matrix I, the matrix being read sequentially row by row. Each MAC computing unit $PE_0$, $PE_1$ receives this value $I_{i,j}$ on one input and receives a coefficient $W_{k,l}$ of the convolution kernel on another input. A MAC computing unit multiplies these two inputs, and then adds to the result a value i that corresponds, in the general case, to the output of another partial sum computing module PE_POOL, as will be explained hereinafter.

The number of MAC computing units is at most equal to the dimension of the convolution kernel since, in a convolutional layer, there are at most $K_x*K_y$ output neurons connected to the same item of input data of the input matrix.

Figure 2A:
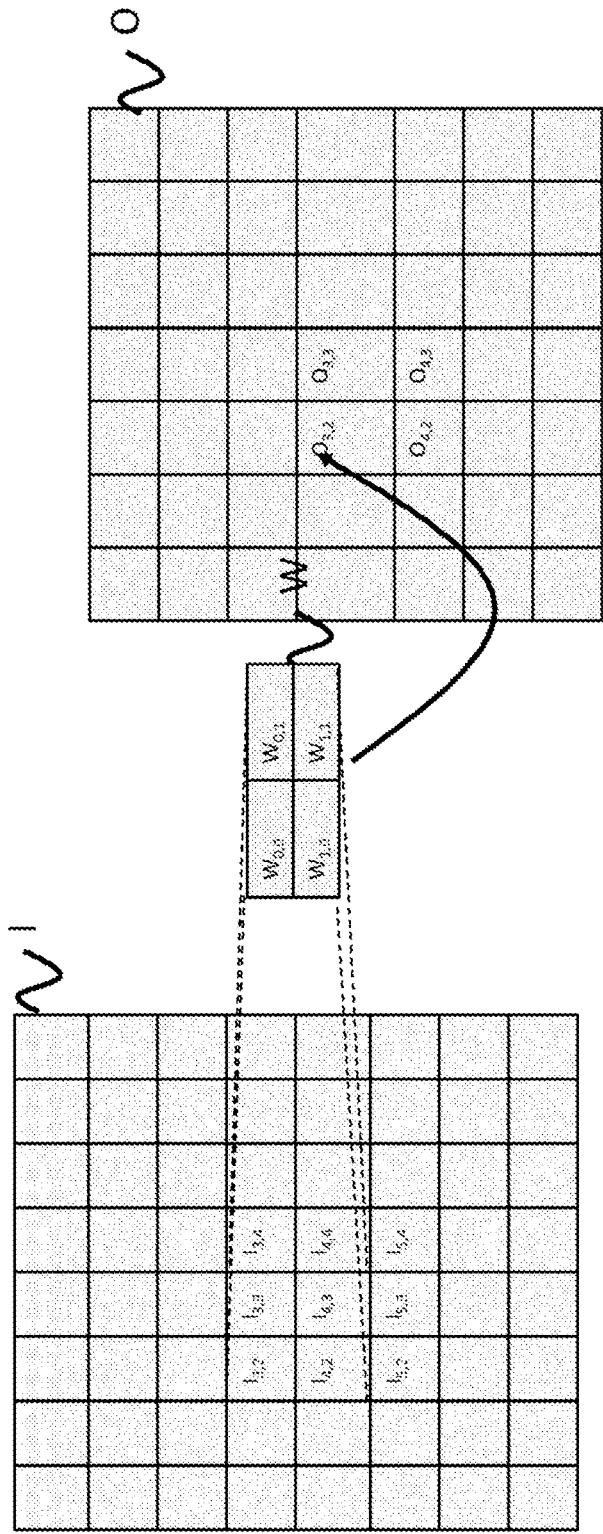
FIG. 2a shows an illustration of one example of a computation carried out by the computing module described in FIG. 2.

FIG. 2a illustrates, in one example, the computations performed by a partial sum computing module PE_POOL for an item of input data $I_{4,3}$ received at input. In the example in FIG. 2a, the convolution kernel W comprises four coefficients and is of size $K_x*K_y$=2×2.

Each item of data of the input matrix I is connected at most to $K_x*K_y$=4 output neurons. In other words, each item of data of the input matrix I contributes to the computation of the value of 4 output neurons. In the example illustrated in FIG. 2a, the item of input data $I_{4,3}$ is connected to the four output neurons $O_{3,2}$, $O_{3,3}$, $O_{4,2}$, $O_{4,3}$. For example, the value of the output neuron $O_{3,2}$ is obtained by applying the filter W to the input sub-matrix formed from the data $I_{3,2}$, $I_{3,3}$, $I_{4,2}$, $I_{4,3}$. The value of the output neuron $O_{33}$ is obtained by applying the filter W to the input sub-matrix formed from the data $I_{3,3}$, $I_{3,4}$, $I_{4,3}$, $I_{4,4}$. The item of input data $I_{4,3}$ is thus common to the four input sub-matrices connected respectively to the four output neurons under consideration.

This principle is applicable to all of the input data, with the difference that the input data located on the edges of the input matrix I are connected to at least one output neuron and at most $K_x*K_y$–1 output neurons.

This observation is used as a basis for the implementation of the computation performed by a partial sum computing module PE_POOL. Specifically, for each item of input data, a partial sum computing module computes all of the products between this item of input data and a coefficient of the filter W that partially contribute to the computation of the value of an output neuron connected to this item of input data.

Considering the example in FIG. 2a, a partial sum computing module carries out the following operations for the item of input data $I_{4,3}$: the product $I_{4,3}*W_{1,1}$ that is involved in the computation of the output neuron $O_{3,2}$.

the product $I_{4,3}*W_{1,0}$ that is involved in the computation of the output neuron $O_{3,2}$, the product $I_{4,3}*W_{0,1}$ that is involved in the computation of the output neuron $O_{4,2}$, the product $I_{4,3}*W_{0,0}$ that is involved in the computation of the output neuron $O_{4,3}$.

Each computed product is then summed with the item of data i that will be explained hereinafter.

Each partial sum computing module processes an item of input data for a duration $T_c$ (expressed in number of clock cycles). This processing duration $T_c$ depends on the degree of parallelization that is implemented, that is to say on the number Nb_PE of MAC computing units operating in parallel in a partial sum computing module. Precisely, $T_c=E\{(K_x*K_y)/Nb\_PE\}$, where E{ } denotes the upper integer part. If the number Nb_PE of MAC computing units is equal to the dimension $K_x*K_y$ of the convolution kernel (which is also equal to the number of output neurons connected to one and the same item of input data), the degree of parallelization is maximum and the processing duration $T_c$ of an item of input data is equal to one clock cycle (assuming that a MAC computation is performed in 1 cycle). Conversely, if just one MAC computing unit is available, the computations carried out on an item of input data are fully serialized, and the duration $T_c$ is equal to $K_x*K_y$ clock cycles.

Picking up on the example in FIG. 2a for which $K_x*K_y$=4, if the partial sum computing module comprises a single MAC computing unit, this manages the processing of an item of input data in four clock cycles so as to compute the contributions of this item of input data to the computations of four output neurons. If the partial sum computing module comprises two MAC computing units, each one manages the processing of the item of input data so as to compute the contributions to the computations of two different output neurons from among the four output neurons connected to the item of input data. The overall processing of the item of input data lasts two clock cycles. If the partial sum computing module comprises three MAC computing units, one unit manages the processing of the item of input data so as to compute the contributions to the computations of two output neurons, and the other two units manage the processing of the item of input data so as to compute the contributions to the respective computations of two other output neurons. In this scenario, the processing of the item of input data by the first MAC computing unit lasts two clock cycles, while the processing of the item of input data by the other two MAC computing units lasts only one clock cycle. Overall, the processing time of an item of input data for the partial sum computing module is two clock cycles (maximum processing duration out of the three MAC computing units). Finally, if the partial sum computing module comprises four MAC computing units, each one manages the processing of the item of input data in relation to a different output neuron, and the overall processing duration of the item of input data is equal to one clock cycle.

The level of parallelization of the partial sum computing module is thus fully configurable.

In each clock cycle, a MAC computing unit has to read a coefficient of the filter W in order to carry out a multiplication with the item of input data for the purpose of computing a different output neuron. Depending on the degree of parallelization, the weighting coefficients of the filter are read in parallel and distributed to each computing unit, or are read sequentially in packets, or both at the same time.

The following table illustrates one example of distribution of the weighting coefficients of a filter of dimensions 3×3 to three computing units $PE_0$, $PE_1$, $PE_2$. The processing duration of an item of input data is equal to three clock cycles. The following table gives, for each clock cycle, the indices of the weighting coefficients delivered to each computing unit for the successive processing of two items of input data $I_0$ and $I_1$. The indices of the weighting coefficients correspond to a row by row left to right read operation.

| Cycle | 0 | 1 | 2 | 3 | 4 | 5 |
|---|---|---|---|---|---|---|
| $PE_0$ | 0 | 3 | 6 | 1 | 4 | 7 |
| $PE_1$ | 2 | 5 | 8 | 0 | 3 | 6 |
| $PE_2$ | 1 | 4 | 7 | 2 | 5 | 8 |
| Item of input data | $I_0$ | $I_0$ | $I_0$ | $I_1$ | $I_1$ | $I_1$ |

A partial sum computing module PE_POOL supplies at output a partial sum vector the size of which is equal to the number of computing units within the module. Each value of the vector is associated with a different output neuron.

There is a direct relationship between the addresses of the input data ($@I_x,@I_y$), the coefficients of the filter ($@W_x$, $@W_y$) and the output neurons ($@O_x,@O_y$):

$$\begin{cases} @o_x = @I_x - @w_x \\ @o_y = @I_y - @w_y \end{cases}$$

The coefficients of the filter are stored in a memory W_MEM. There may be various filters for various input matrices and for various output matrices, as will be explained hereinafter.

The input data arrive in real time, and they correspond to a row by row read operation on each input matrix. In order to be able to compute the partial sums associated with the output neurons, the architecture of the computer according to the invention should comply with two conditions. First of all, one and the same output neuron cannot be processed by two different MAC computing units. In other words, each MAC computing unit is responsible for computing partial sums that contribute to one or more output neuron(s) different from those processed by the other MAC computing units. Then, for one and the same item of input data, the distribution of the computations within all of the partial sum computing modules should be identical. In other words, the distribution of the processing of the output neurons between the MAC computing units within a partial sum computing module is identical for all of the partial sum computing modules.

In the knowledge that the input data addresses ($@I_x,@I_y$) are set by sequentially reading the data in an input matrix, the distribution of the assignments of the output neurons to each MAC computing unit depends on the addresses of the coefficients of the filter in memory.

A description is now given of one exemplary embodiment of a mechanism for distributing the coefficients of a filter in memory to the various MAC computing units of a partial sum computing module. This example is given by way of Illustration and without limitation, it being understood that a person skilled in the art would readily know how to adapt this mechanism to other distribution schemes.

Considering a filter of dimensions ($K_x,K_y$), it is known that, for each new item of input data, there are at most $K_x * K_y$ different output neurons connected to this item of input data. In the following example, a case is assumed in which there are exactly $K_x * K_y$ output neurons connected to the item of input data (the most general case, excluding the data located on the edges of the input matrix).

The $K_x * K_y$ output neurons may be identified by their reduced coordinates $@O_x$ mod $K_x$ and $@O_y$ mod $K_y$ in a matrix of size ($K_x,K_y$), where mod is the modulo function.

One possible distribution of the coefficients of the filter according to the output neuron to be computed and on the basis of the received item of input data is given by the following relationships:

$$@w_x = \begin{cases} @I_x \mathrm{mod} K_x - @O_x \mathrm{mod} K_x & \text{if } @I_x \mathrm{mod} K_x \geq @O_x \mathrm{mod} K_x \\ @I_x \mathrm{mod} K_x - @O_x \mathrm{mod} K_x + K_x & \text{otherwise} \end{cases}$$

$$@w_y = \begin{cases} @I_y \mathrm{mod} K_y - @O_y \mathrm{mod} K_y & \text{if } @I_y \mathrm{mod} K_y \geq @O_y \mathrm{mod} K_y \\ @I_y \mathrm{mod} K_y - @O_y \mathrm{mod} K_y + K_y & \text{otherwise} \end{cases}$$

Using these relationships and the constraint that an output neuron should be entirely computed by the same MAC computing unit within each partial sum computing module, it is possible to deduce therefrom, for each new received item of input data, the addresses of the coefficients of the filter to be read in memory in order to compute a partial sum associated with a given output neuron.

Figure 2B:
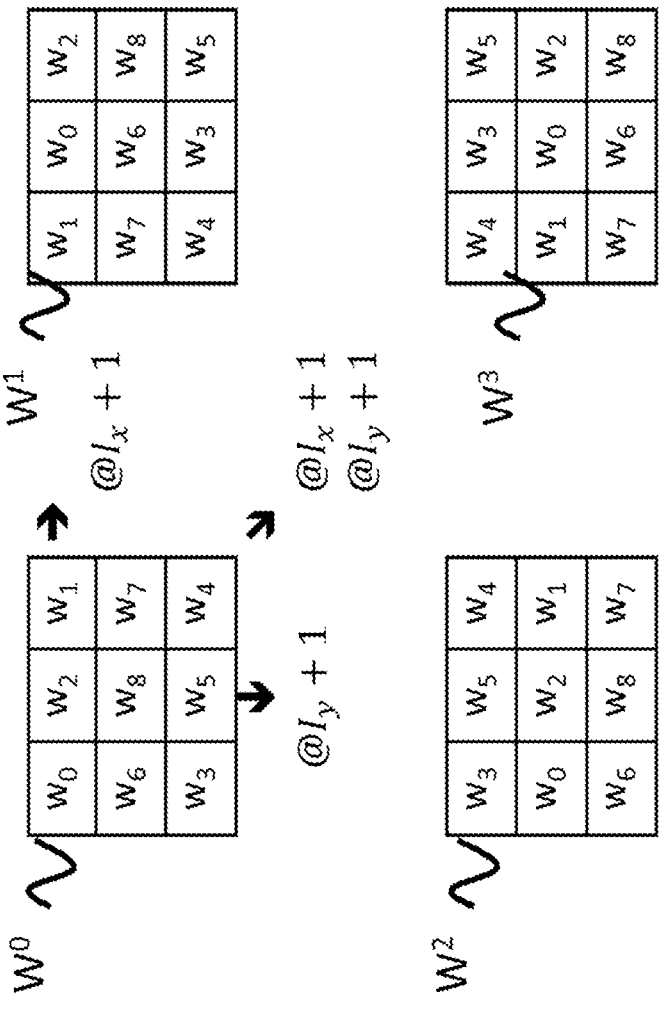
FIG. 2b shows an illustration of one example of distribution of the coefficients of a filter in a partial sum computing module.

FIG. 2b illustrates one example of a mechanism for distributing the coefficients of a filter of dimensions 3×3. FIG. 2b shows 3×3 matrices that give, at various times, the indices of the coefficients of the filter to be used to compute a partial sum associated with an output neuron of reduced coordinates given by the coordinates of the elements of the matrix.

The index of a coefficient of the filter is given by the relationship $@W_x + @W_y * K_x$.

The first matrix $W^0$ gives the indices of the coefficients to be used for the first item of input data $I_{0,0}$. For each new item of input data read on a row of the input matrix, the matrix of the coefficients of the filter undergoes a circular permutation of the columns. For example, the matrix $W^1$ is used for the second item of input data $I_{0,1}$.

When an entire row of the input matrix is read and a new row is started, the first matrix $W^0$ is returned to and a circular permutation of the rows is applied thereto in order to obtain the matrix $W_2$. Next, a circular permutation of the columns is again applied to each new item of input data read on a row, thereby giving the matrix $W_3$ for the second item of input data in the second row in the example of FIG. 2b. This is the consequence of distributing the coefficients of the filter according to the output neuron chosen above and results directly from the above relationships.

The coefficients of the filters may be distributed to the computing units in multiple ways.

Figure 2C:
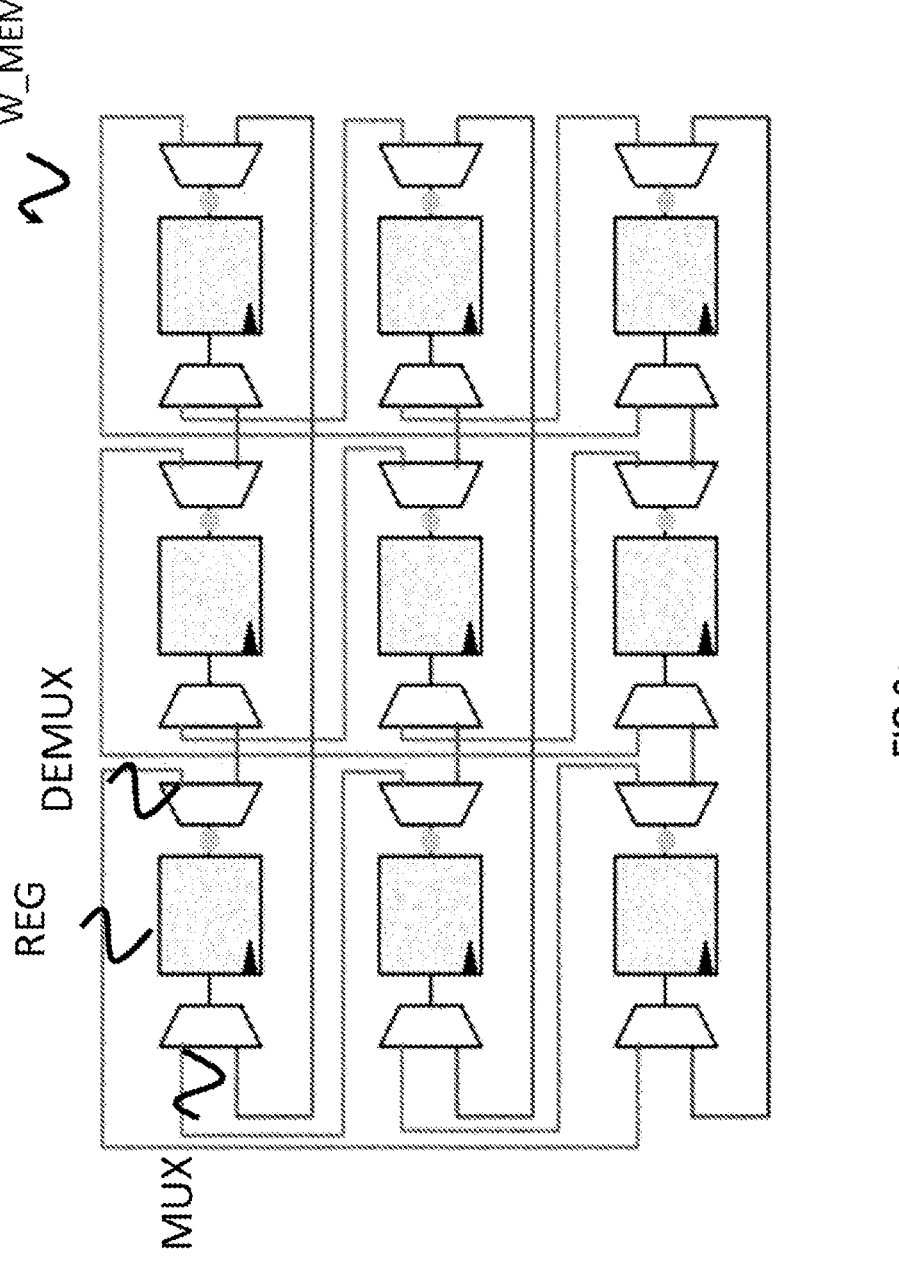
FIG. 2c shows a diagram of a 2D torus for storing the coefficients of a filter in memory.

FIG. 2c illustrates one implementation of storing the coefficients of the filters in the form of a memory having a two-dimensional toroidal topology. The example in FIG. 2c corresponds to the example in FIG. 2b, that is to say a filter of dimensions 3×3.

The device described in FIG. 2c comprises as many registers REG as there are coefficients, each register being flanked by a multiplexer MUX with two inputs and one output and a demultiplexer DEMUX with one input and two outputs. The connections between the various multiplexers and demultiplexers are designed to allow permutations to be carried out on the basis of the x and y coordinates.

It is possible to store either the values of the coefficients of the filters in the various registers or the addresses of these coefficients stored elsewhere in another memory.

Upon each new received item of input data, the permutation mechanism described in FIG. 2b is applied to the device in FIG. 2c, and the various MAC computing units read the values of the coefficients in the corresponding registers.

In the embodiment described in FIGS. 2b and 2c, the permutations are performed in one cycle. When there is a row jump in an input matrix, the positions of the weighting coefficients in the columns are returned to their initial position (position for $I_x=0$) at the same time as the row permutations are performed. This is possible because the size of the image to be processed is known, and it is therefore possible to deduce therefrom the state of the permutations of the columns of the filter W at the end of a row of an input image. The multiplexers MUX used to permute the rows are connected in such a way as to also permute the columns of the filter W in order to return them to their initial positions.

Figure 2D:
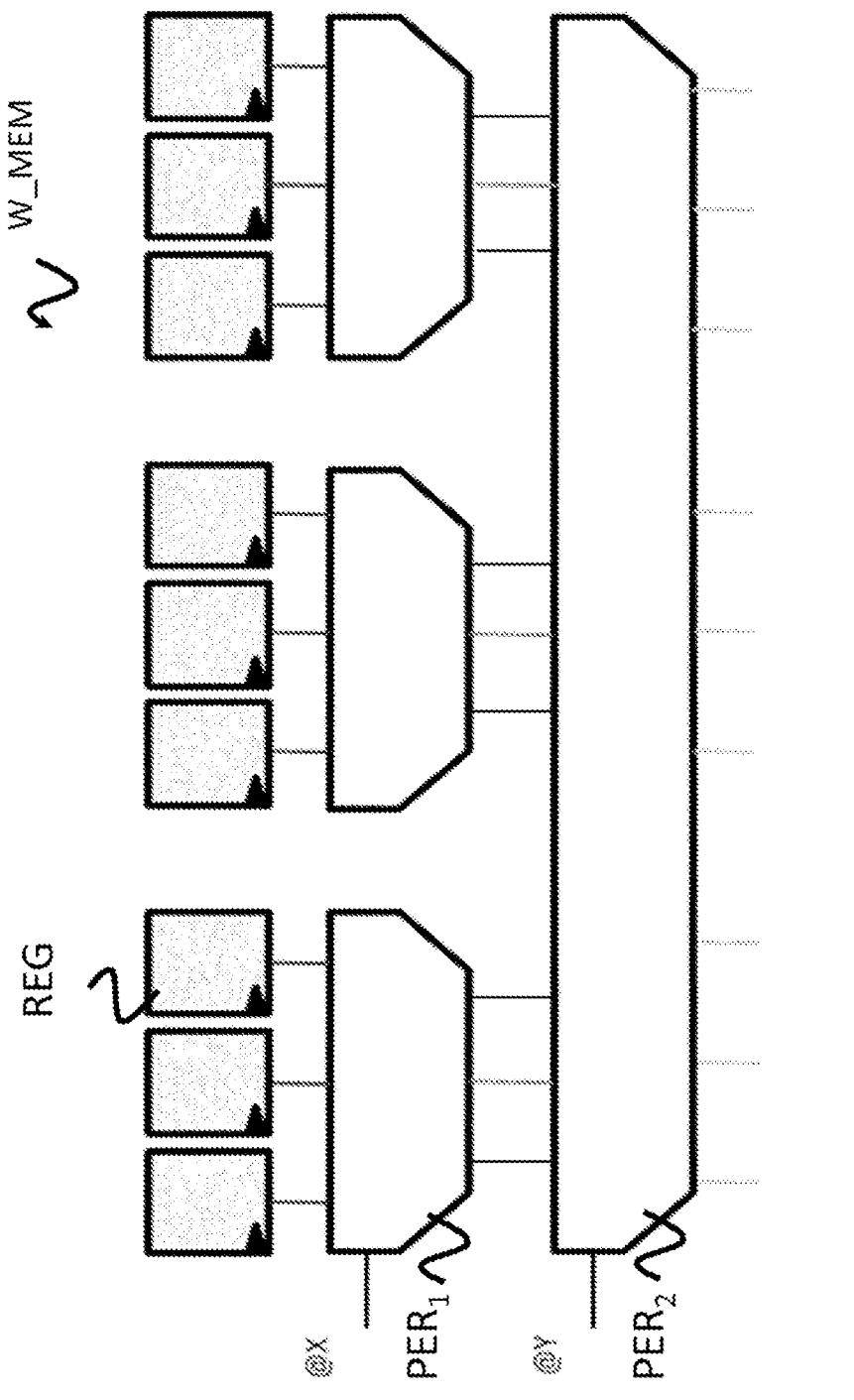
FIG. 2d shows a diagram of a distribution tree for storing the coefficients of a filter in memory.

FIG. 2d describes another structure for storing and distributing the coefficients. This structure is in the form of a tree. It has as many registers REG or ROM memories as there are coefficients. It also comprises multiple permutation devices $PER_1$, $PER_2$ able to read the values in the various registers and to permute them in order to supply, at output, the values of the coefficients in a different read order.

This structure is described notably in the Applicant's French patent application published under number FR 3050846.

If the number of MAC computing units per partial sum computing module is strictly less than the number of coefficients of a filter, one or more multiplexers are added to the distribution structure described in FIG. 2c or 2d, in order to select the coefficients to be read on the basis of the degree of parallelism. This selection of the coefficients in order to serialize the computations is performed between two input data read operations.

The distribution logic for the coefficients is identical for all of the partial sum computing modules, with the difference that a latency is introduced into the transmission of the coefficients to the computing module according to the level of the module in the cascade structure within a set of modules.

It is thus possible to have a common control logic for all of the computing modules, with a toggle on the control signals going from one module to the next, and so on. The control logic may also be distributed for each computing module, with the appropriate latency taken into account directly in the control logic.

Figure 3:
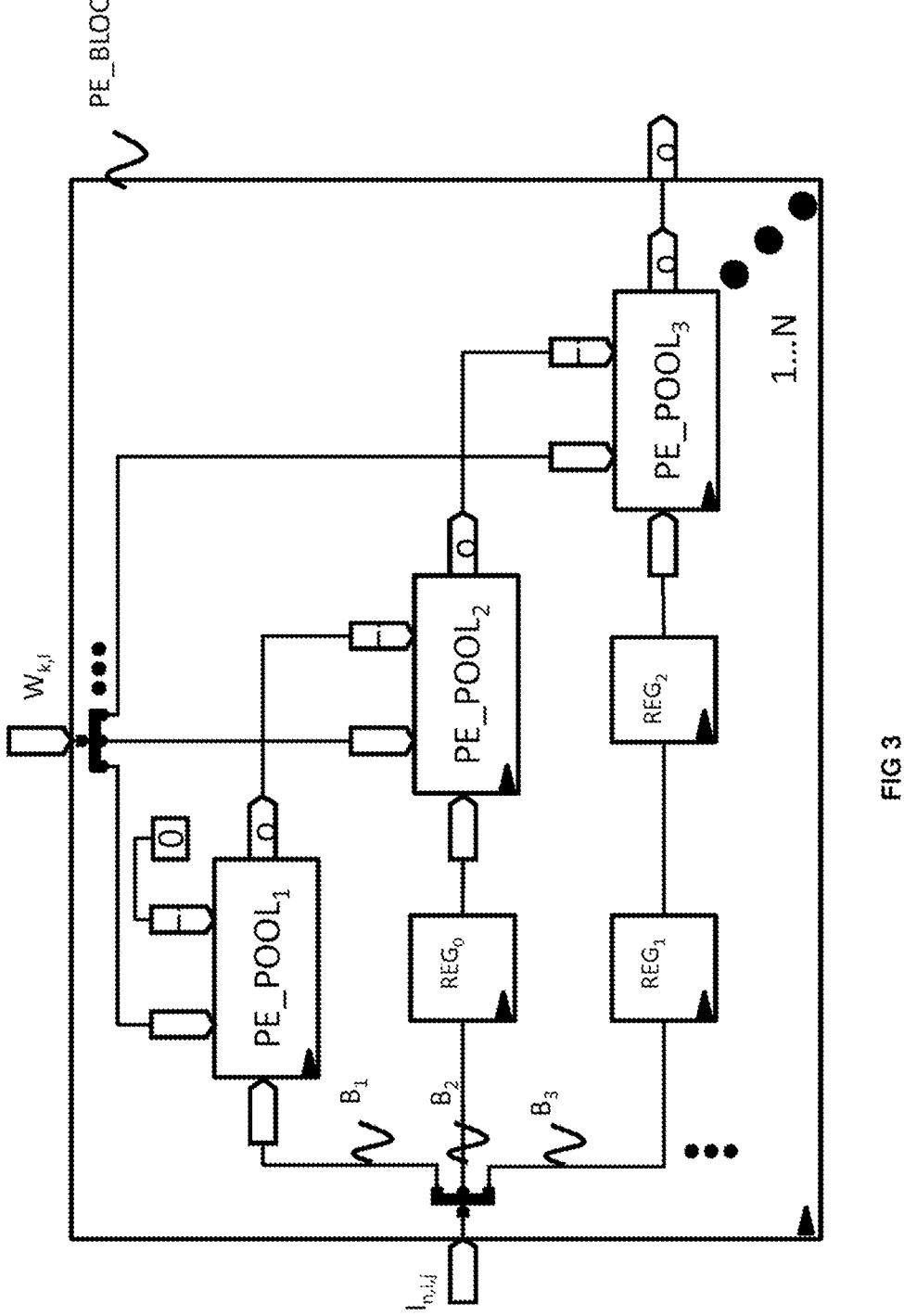
FIG. 3 shows a diagram of a set of partial sum computing modules according to the invention comprising several of said modules arranged in cascade.

FIG. 3 shows a diagram of a set PE_BLOC of partial sum computing modules arranged in cascade, that is to say connected in series. The set PE_BLOC comprises a number of computing modules between 1 and N. N being the number of matrices to be processed at input of the convolutional layer. The choice of the number of computing modules depends on the degree of parallelization of the set PE_BLOC.

The set PE_BLOC receives, at input, the input data $I_{n,\,i,\,j}$ belonging to the N input matrices of the convolutional layer and having the same coordinates (i,j) in each matrix. For example, this is the same pixel in each image. When the set PE_BLOC comprises multiple partial sum computing modules, these are arranged in cascade such that the first computing module PE_POOL; receives the value 0 on its input "i" and each following computing module is connected, via its input "i", to the output of the preceding computing module. This principle is illustrated in FIG. 3 with three partial sum computing modules. The last computing module $PE\_POOL_3$ delivers, at output, the result of the computation carried out globally by the set PE_BLOC. Without departing from the scope of the invention, the value 0 received on the input "i" of the first computing module PE_POOL, may be set to a predetermined value other than the value 0 so as to add a bias value to the computations.

In the same way as for a partial sum computing module, the processing operations carried out by the set PE_BLOC may be able to be parallelized to a greater or lesser extent depending on the number of partial sum computing modules that it contains.

When the set PE_BLOC contains as many partial sum computing modules as there are number of input matrices N, the computations are fully parallelized and each partial sum computing module processes the data in relation to one matrix. The values obtained at output of the set PE_BLOC correspond to partial sums of the products of an item of input data and a weighting coefficient, over all of the matrices. This value is formalized by a relationship of the type:

$$S = \sum_{n=0}^{N} I_{n,i,s_i+k,j,s_j+l},\, W_{k,l}$$

In order to be able to carry out the sum over N matrices, the partial sum computing modules are chained, and latencies have to be imposed on the input data of each computing module in order to synchronize the output of a computing module with the input "i" of the following computing module. The latency to be imposed at the input of the $k^{th}$ computing module is equal to $(k-1)*T_c$. Specifically, each computing module has to wait for the computation carried out by the preceding computing modules to carry out its computation. The duration of the processing carried out by a computing module for an item of input data is equal to $T_c$. To implement this latency, one or more shift registers $REG_0$, $REG_1$, $REG_2$ are positioned between the input of the set PE_BLOC and the inputs of the computing modules $PE\_POOL_2$, $PE\_POOL_3$, excluding the first computing module $PE\_POOL_1$.

A shift register positioned upstream of the $k^{th}$ computing module implements a latency equal to $(k-1)*T_c$. For example, there is no latency at input of the first computing module $PE\_POOL_1$. A shift register $REG_0$ with a shift of one cycle time T is positioned upstream of the second computing module $PE\_POOL_2$. This shift register holds the item of input data for a cycle time before supplying it to the input of the second computing module $PE\_POOL_2$. A shift register with a shift of two cycle times $2*T_c$ (or two shift registers $REG_1$, $REG_2$ each with a shift of one cycle time) is positioned upstream of the third computing module $PE\_POOL_3$, and so on.

The partial sum computing modules $PE\_POOL_1$, $PE\_POOL_2$, $PE\_POOL_3$ of one and the same set $PE\_BLOC$ are configured so as to process the input data read from a number N of input matrices with a latency that increases as a function of the index of the input matrix. As indicated in FIG. 3, this latency may be introduced in the form of registers $REG_0$, $REG_1$. $REG_2$ positioned on the input data buses $B_1$, $B_2$, $B_3$ of the set $PE\_BLOC$.

This latency is applied in the same way to the coefficients of the convolution filters as a function of the input matrix. To apply this latency to the coefficients of the filters, one option is to add shift registers $REG_0$, $REG_1$, $REG_2$ of the same kind to the data buses linking the memory for storing the coefficients of the filters to the computing modules $PE\_POOL$.

Another option consists in circularly shifting the weighting coefficients in the memory, the circular shift being equal to $(n-1)$, where n is the index of the input matrix, which varies from 1 to N. This shift is for example carried out materially after the permutations have been applied.

When a set $PE\_BLOC$ contains just one partial sum computing module, it sequentially performs the operations for all of the input matrices. The input data are then presented at input of the set $PE\_BLOC$ in packets of N data with the same coordinates in each matrix. In this case, the partial sum over the N matrices is not performed by the set $PE\_BLOC$, but is performed by an adder external to the set $PE\_BLOC$.

When the set $PE\_BLOC$ contains a number of partial sum computing modules strictly greater than 1 and strictly less than N, the computations are partially parallelized and sequentialized.

Each computing module processes the data corresponding to only some of the matrices. The partial sums are carried out for some of the matrices, the final sum over all of the matrices being carried out by an adder external to the set $PE\_BLOC$.

The following table illustrates one example of the sequencing of the operations carried out by a set $PE\_BLOC$ comprising two partial sum computing modules for computing partial sums $PE\_POOL_0$, $PE\_POOL_1$ and receiving, at input, four matrices indexed by the indices 0, 1, 2, 3.

| Cycle | $T_c$ | $2*T_c$ | $3*T_c$ | $4*T_c$ | $5*T_c$ | $6*T_c$ |
|---|---|---|---|---|---|---|
| $PE\_POOL_0$ | 0 | 2 | 0 | 2 | 0 | 2 |
| $PE\_POOL_1$ | 1 | 3 | 1 | 3 | 1 | 3 |

The degree of parallelism of the set $PE\_BLOC$ is equal to $T_n=N/Nb\_PE\_POOL$, where $Nb\_PE\_POOL$ is the number of partial sum computing modules.

In total, to process an item of input data on each input matrix and for an associated output neuron, the computing time necessary for the set $PE\_BLOC$ is equal to $T_n*T_c$.

It should be noted that the filters applied to the input matrices may be different from one another, and each partial sum computing module $PE\_POOL$ thus accesses different filters.

Figure 4:
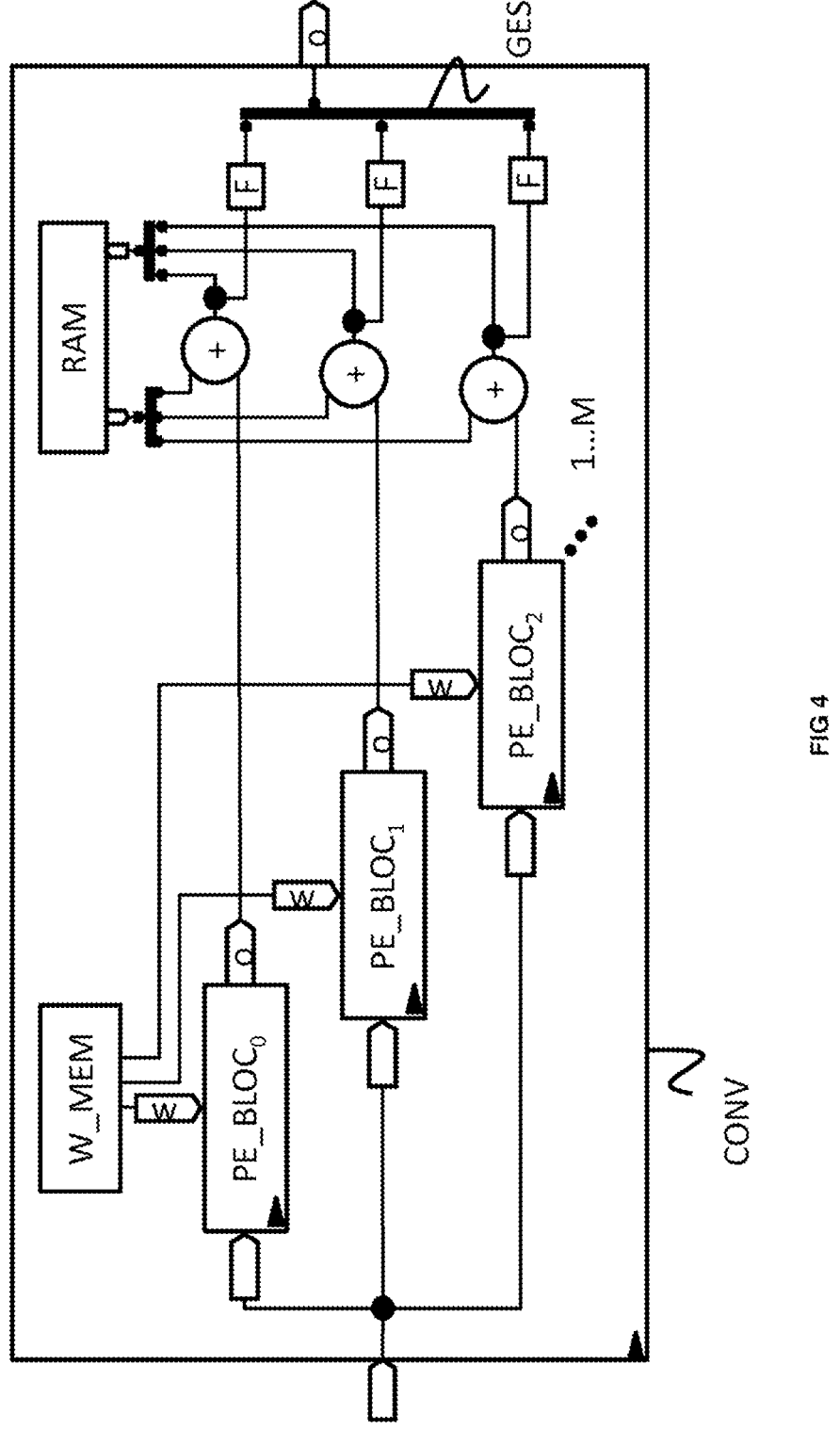
FIG. 4 shows a diagram of a computer of a convolutional layer according to the invention.

FIG. 4 schematically shows one example of the architecture of a computer CONV of a convolutional layer according to one embodiment of the invention. The computer CONV comprises one or more sets $PE\_BLOC$ of partial sum computing modules, the maximum number of sets being equal to the number of output matrices M of the convolutional layer. Each set $PE\_BLOC$ receives the same inputs simultaneously. In other words, each item of input data produced at input of the computer CONV is duplicated on the inputs of each set $PE\_BLOC$. The computer CONV furthermore comprises a first memory $W\_MEM$ for saving the coefficients of one or more convolution kernels Wm. The number of convolution kernels is at most equal to the number of input matrices N multiplied by the number of output matrices M, N×M. The memory $W\_MEM$ is associated with a read bus of size equal to $Nb\_PE*Nb\_PE\_POOL*Nb\_PE\_BLOC$, where $Nb\_PE\_BLOC$ is the number of sets $PE\_BLOC$ in a computer CONV. The memory $W\_MEM$, or its addressing (in the case of a RAM memory), is implemented for example by way of one of the devices described in FIG. 2c or 2d. The memory $W\_MEM$ and the control logic of this memory may also be distributed in the sets $PE\_BLOC$.

The computer CONV furthermore comprises at least one adder or accumulator connected to the output of each set $PE\_BLOC$, on the one hand, and to a second RAM memory, on the other hand. The second RAM memory may be duplicated for each adder. Although FIG. 4 shows a single adder for each set $PE\_BLOC$, it is possible to have multiple adders processing the data produced by a set $PE\_BLOC$ in parallel when there are multiple MAC computing units per partial sum computing module. The number of adders is equal to the number of MAC computing units per partial sum computing module or, in other words, to the size of the data bus at output of a set $PE\_BLOC$. The values delivered in parallel at output of a set $PE\_BLOC$ correspond to different output neurons, and may therefore be processed in parallel by each adder.

The second RAM memory is used to store results of partial sums carried out by an accumulator in order to finalize the sum over the size of the convolution kernel and over the set of matrices if the sets $PE\_BLOC$ do not have a maximum degree of parallelization. The RAM memory is dimensioned to store at least a number equal to $M*(O_x*(K_y-1)+K_x-1)$ partial sums. The RAM memory is accompanied by a read/write bus of size equal to the number of partial sums computed in parallel, that is to say $Nb\_PE*Nb\_PE\_BLOC$. The addresses of the values stored in the RAM memory are computed so as to avoid two output neurons during the computation sharing the same memory block.

In order to be able to obtain the value of an output neuron, it is necessary to sum the partial sums delivered by a set $PE\_BLOC$ in order to process all of the input data of a receptive field of a neuron. In other words, it is necessary to sum all of the partial sums associated with an item of input data connected to one and the same neuron. In the knowledge that the input data are received sequentially, it is necessary to store multiple partial sums in the RAM memory. However, it is not necessary to store all of the partial sums for all of the neurons of an output matrix because, once the value of a neuron has been computed, its memory space may be reallocated in order to compute another neuron.

The addressing of the RAM memory is determined on the basis of the addresses of the output neurons. Each address in the RAM memory is associated with a different output neuron. When a convolutional computation has finished, the memory space used to store the partial results of the computation is freed up and may be reused for another output neuron.

The computer CONV furthermore comprises an activation module F configured so as to apply a transfer function specific to the neuron to the result of the convolution computation. The activation function implemented by the activation module F may take various forms. It may for example be a RELU (for "Rectifier Linear Unit") function, which is a function of the type $f(x)=max(0.x)$ where $max( )$ denotes the maximum function of the two operands. The function that is carried out may also be of the type $f(x)=\log (1+\exp (x))$. The activation function may also be a sigmoid function, for example a hyperbolic tangent function. Any other appropriate non-linear function may also be contemplated.

Moreover, the activation module F may comprise a shift register in order to adjust the dynamics of the values of the output neurons.

The computer CONV may comprise an output manager GES for reforming a vector of M values at output of the computer if Nb_PE_BLOC is strictly less than M. Specifically, in this scenario, one or more sets PE_BLOC carry out convolution computations for multiple output neurons (potentially) associated with various convolution kernels. In this case, the data processed by a set PE_BLOC are vectors of size equal to the number of associated neurons. The output manager may comprise a demultiplexer and one or more registers.

The computer CONV may also comprise an input manager (not shown in FIG. 4) for managing the sequencing of the input data when the processing of the input matrices is partially or fully sequentialized, that is to say when Nb_PE_POOL<N.

The computer CONV according to the embodiments of the invention may be used in many fields of application, in particular in applications in which a classification of data is used. The fields of application of the computer CONV according to the embodiments of the invention comprise, for example, video-surveillance applications with real-time recognition of people, interactive classification applications implemented in smartphones for interactive classification applications, data fusion applications in home surveillance systems, etc.

The computer CONV according to the invention may be implemented using hardware and/or software components. The software elements may be present in the form of a computer program product on a computer-readable medium, which medium may be electronic, magnetic, optical or electromagnetic. The hardware elements may be present, in full or in part, notably in the form of dedicated integrated circuits (ASICs) and/or configurable integrated circuits (FPGAs) and/or in the form of neural circuits according to the invention or in the form of a digital signal processor DSP and/or in the form of a graphics processor GPU, and/or in the form of a microcontroller and/or in the form of a general-purpose processor, for example. The computer CONV also comprises one or more memories, which may be registers, shift registers, a RAM memory, a ROM memory or any other type of memory suitable for implementing the invention.

Although the invention has been described in the context of two-dimensional input data, it may be extended to N-dimensional convolution computations, where N is strictly greater than two. In this case, the input data structures, the convolution kernels and the output maps have N dimensions instead of two. In particular if N=3, the input data may be video sequences, the three dimensions including the two spatial dimensions and time.

The invention claimed is:

1. A computer for computing a convolutional layer of an artificial neural network, comprising:

at least one set of at least two partial sum computing modules connected in series, a storage member for storing the coefficients of at least one convolution filter, each partial sum computing module comprising several computing units each configured so as to carry out a multiplication of an item of input data of the computer and a coefficient of a convolution filter, followed by an addition of the output of the preceding partial sum computing module in the series or of a predefined value for the first partial sum computing module in the series, each set furthermore comprising, for each partial sum computing module except the first in the series, a shift register connected at input for storing the item of input data for the processing duration of the preceding partial sum computing modules in the series, said shift register being connected at output to the next partial sum computing module in the series and being configured to introduce a latency equivalent to said processing duration to the data received by said next partial sum computing module in the series, the computer furthermore comprising at least one accumulator connected at output of each set and a memory, the input data of the computer coming from at least two input matrices, each partial sum computing module being configured so as to receive, at input, the input data belonging to different input matrices and having the same coordinates in each input matrix, in each clock cycle, a value of one of the at least two input matrices, read sequentially row by row, being received at input of one of the at least two partial sum computing modules, said value being received, in parallel, at input of each computing unit belonging to said one of the at least two partial sum computing modules, said computing units each receiving a coefficient of the convolution filter to implement a multiplication with said value in order to compute a different output neuron.

2. The computer as claimed in claim 1, configured so as to deliver, at output, for each input sub-matrix of dimension equal to that of the convolution filter, the value of a corresponding output neuron, the set of output neurons being arranged in at least one output matrix.

3. The computer as claimed in claim 2, wherein each partial sum computing module comprises at most a number of computing units equal to the dimension of the convolution filter.

4. The computer as claimed in claim 2, wherein each set comprises at most a number of partial sum computing modules equal to the number of input matrices.

5. The computer as claimed in claim 2, comprising at most a number of sets equal to the number of output matrices.

6. The computer as claimed in claim 2, wherein, for each received item of input data, each partial sum computing module is configured so as to compute a partial convolution result for all of the output neurons connected to the item of input data.

7. The computer as claimed in claim 6, wherein each partial sum computing module comprises multiple comput- ing units, each one being configured so as to compute a partial convolution result for different output neurons of the other computing units.

8. The computer as claimed in claim 6, wherein each partial sum computing module is configured, for each received item of input data, so as to select, in the storage member, the coefficients of a convolution filter correspond- ing to the respective output neurons to be computed for each computing unit.

9. The computer as claimed in claim 2, wherein the input matrices are images.

10. The computer as claimed in claim 1, wherein the storage member has a two-dimensional toroidal topology.

11. The computer as claimed in claim 1, wherein the at least one accumulator connected at output of each set is configured so as to finalize a convolution computation in order to obtain the value of an output neuron from the partial sums delivered by the set the memory being used to save partial results of the convolution computation.

12. The computer as claimed in claim 11, wherein the addresses of the values stored in the memory are determined and configured to avoid two output neurons during the computation sharing the same memory block.

13. The computer as claimed in claim 1, furthermore comprising an activation module for activating an output neuron, connected at output of each accumulator.

\* \* \* \* \*